US012435740B2

(12) United States Patent
Hahn

(10) Patent No.: US 12,435,740 B2
(45) Date of Patent: Oct. 7, 2025

(54) HYDRAULIC FORCE FIGHT MITIGATION

(71) Applicant: Woodward, Inc., Fort Collins, CO (US)

(72) Inventor: Michael L. Hahn, Fort Collins, CO (US)

(73) Assignee: Woodward, Inc., Fort Collins, CO (US)

( * ) Notice: Subject to any disclaimer, the term of this patent is extended or adjusted under 35 U.S.C. 154(b) by 0 days.

(21) Appl. No.: 17/984,976

(22) Filed: Nov. 10, 2022

(65) Prior Publication Data

US 2023/0151829 A1 May 18, 2023

Related U.S. Application Data

(60) Provisional application No. 63/264,002, filed on Nov. 12, 2021.

(51) Int. Cl.
*F15B 11/22* (2006.01)
*F15B 18/00* (2006.01)
(Continued)

(52) U.S. Cl.
CPC .............. *F15B 11/22* (2013.01); *F15B 18/00* (2013.01); *B64C 13/42* (2013.01); *F15B 13/02* (2013.01); *F15B 2013/0409* (2013.01); *F15B 2013/0412* (2013.01); *F15B 13/043* (2013.01); *F15B 15/1404* (2013.01); *F15B 20/008* (2013.01); *F15B 21/087* (2013.01);
(Continued)

(58) Field of Classification Search
CPC ...... F15B 11/22; F15B 18/00; F15B 15/1404; F15B 2013/0412; F15B 2211/7107; F15B 2211/782; F15B 2211/757; F15B 2211/327; F15B 2211/6656; F15B 2211/8636; F15B 21/87
See application file for complete search history.

(56) References Cited

U.S. PATENT DOCUMENTS 3,338,139 A * 8/1967 Wood ...................... B64C 13/24
91/1
3,411,411 A * 11/1968 Fleck ...................... F15B 18/00
91/1
(Continued)

FOREIGN PATENT DOCUMENTS

EP 0092972 11/1983
EP 256648 2/1988
(Continued)

OTHER PUBLICATIONS

Invitation to Pay Additional Fees and, Where Applicable, Protest Fee in International Application No. PCT/US2022/049682, mailed on Feb. 20, 2023, 12 pages.
(Continued)

*Primary Examiner* — Dustin T Nguyen
(74) *Attorney, Agent, or Firm* — Fish & Richardson P.C.

(57) ABSTRACT

The subject matter of this specification can be embodied in, among other things, a method that includes controlling, by a first fluid valve, a first fluid flow to a first fluid actuator, actuating, by the first fluid actuator, an output, controlling, by a second fluid valve, a second fluid flow to a second fluid actuator, and actuating, by the second fluid actuator, the output.

8 Claims, 9 Drawing Sheets

(51) Int. Cl.
   *B64C 13/42*    (2006.01)
   *F15B 13/02*    (2006.01)
   *F15B 13/04*    (2006.01)
   *F15B 13/043*   (2006.01)
   *F15B 15/14*    (2006.01)
   *F15B 20/00*    (2006.01)
   *F15B 21/08*    (2006.01)

(52) U.S. Cl.
   CPC . *F15B 2211/3133* (2013.01); *F15B 2211/327* (2013.01); *F15B 2211/634* (2013.01); *F15B 2211/6656* (2013.01); *F15B 2211/7107* (2013.01); *F15B 2211/782* (2013.01); *F15B 2211/8636* (2013.01); *F15B 2211/8757* (2013.01)

(56) References Cited

U.S. PATENT DOCUMENTS

| | | | |
|---|---|---|---|
| 3,433,125 A | 3/1969 | Gemmell | |
| 3,482,486 A * | 12/1969 | Nordholm, Jr. | B64C 13/42 |
| | | | 91/509 |
| 4,166,506 A * | 9/1979 | Tezuka | E02F 3/844 |
| | | | 91/461 |
| 4,567,813 A | 2/1986 | Garnjost | |
| 5,806,805 A * | 9/1998 | Elbert | B64C 13/42 |
| | | | 244/76 A |
| 6,446,432 B1 * | 9/2002 | Flavell | B64C 13/504 |
| | | | 60/405 |
| 6,612,393 B2 * | 9/2003 | Bohner | B62D 5/06 |
| | | | 180/407 |
| 6,923,405 B2 | 8/2005 | Cline et al. | |
| 7,828,245 B2 * | 11/2010 | Suisse | B64C 13/505 |
| | | | 244/99.2 |
| 8,210,206 B2 * | 7/2012 | Coakley | F15B 20/008 |
| | | | 137/625.68 |
| 8,677,885 B2 * | 3/2014 | Lauffer | B64C 13/505 |
| | | | 91/509 |
| 10,458,557 B2 * | 10/2019 | DeFusco | F16K 11/161 |
| 2017/0307090 A1 | 10/2017 | DeFusco | |

FOREIGN PATENT DOCUMENTS

| | | | |
|---|---|---|---|
| EP | 2848521 | 1/2016 | |
| GB | 0092972 A2 * | 4/1983 | F15B 18/00 |

OTHER PUBLICATIONS

International Search Report and Written Opinion in International Application No. PCT/US2022/049682, mailed on May 3, 2023, 19 pages.

International Preliminary Report on Patentability in International Application No. PCT/US2022/049682, mailed on May 23, 2024, 12 pages.

* cited by examiner

HYDRAULIC FORCE FIGHT MITIGATION

CROSS-REFERENCE TO RELATED PATENT APPLICATIONS

This application claims the benefit of priority to U.S. Provisional Patent Application No. 63/264,002, filed Nov. 12, 2021, the contents of which are incorporated by reference herein.

TECHNICAL FIELD

This instant specification relates to fluid actuators, more specifically dual redundant hydraulic actuators for aircraft.

BACKGROUND

In some applications, such as aircraft control surface positioning or systems in which control redundancy is useful or required, a shared mechanical output is driven by two or more redundant fluid actuators. Force fight occurs when more than one actuator is operating on the same rigid mechanical output and there is a difference between them. No two actuators and/or control loops are perfectly identical and, as a result, the displacements of the two actuators is rarely, if ever, equal. When two (or more) actuators apply different levels of actuation to a shared, stiff or rigid mechanical output, a force fight is generated. Such force fights can place significant and potentially damaging stresses and/or torques across the shared mechanical output.

In an effort to mitigate the effects of force fight, some actuating systems are overbuilt in order to withstand not only external forces but also the internal force fighting loads. Some other force fight mitigation strategies implement differential pressure transducers in complex closed feedback control loops in an effort to control differential forces through the use of electronic control techniques.

SUMMARY

In general, this document describes fluid actuators, more specifically dual redundant hydraulic actuators for aircraft.

In an example embodiment, a fluid actuator system includes a first fluid actuator configured to actuate an output, a second fluid actuator configured to redundantly actuate the output, a first fluid valve configured to control a first fluid flow to the first fluid actuator, and a second fluid valve configured to control a second fluid flow to the second fluid actuator.

Various embodiments can include some, all, or none of the following features. The first fluid actuator can include a first piston, a first fluid chamber configured to receive fluid to urge movement of the first piston in a first direction, and a second fluid chamber configured receive fluid to urge movement of the first piston in a second direction opposite the first direction. The first fluid valve can include a first valve body configured to permit the first fluid flow to the first fluid chamber in a first configuration, permit the first fluid flow to the second fluid chamber in a second configuration, and block the first fluid flow to the first fluid chamber and the second fluid chamber in a third configuration. The second fluid actuator can include a second piston, a third fluid chamber configured to receive fluid to urge movement of the second piston in a first direction, and a fourth fluid chamber configured to receive fluid to urge movement of the second piston in a second direction opposite the first direction. The second fluid valve can include a second valve body configured to permit the second fluid flow to the third fluid chamber in a first configuration, permit the second fluid flow to the fourth fluid chamber in a second configuration, and permit the second fluid flow to the third fluid chamber and the fourth fluid chamber in a third configuration. The second fluid valve can include at least one fluid inlet, a first fluid outlet, a second fluid outlet, a valve body is configured to (1) fluidically connect the fluid inlet to the first fluid outlet in a first configuration, (2) fluidically connect the fluid inlet to the second fluid outlet in a second configuration, and (3) fluidically connect the fluid inlet to the first fluid outlet and the second fluid outlet in a third configuration.

In an example implementation a method of fluid actuation includes controlling, by a first fluid valve, a first fluid flow to a first fluid actuator, actuating, by the first fluid actuator, an output, controlling, by a second fluid valve, a second fluid flow to a second fluid actuator, and actuating, by the second fluid actuator, the output.

Various implementations can include some, all, or none of the following features. The method can include receiving, by a first fluid chamber of the first fluid actuator, the first fluid flow, urging, by the first fluid flow received by the first fluid chamber, a first piston of the first fluid actuator in a first direction, receiving, by a second fluid chamber of the first fluid actuator, the first fluid flow, and urging, by the first fluid flow received by the second fluid chamber, the first piston in a second direction opposite the first direction. The method can include configuring a first valve body of the first fluid valve to a first configuration, permitting, by the first valve body in the first configuration; the first fluid flow to the first fluid chamber, configuring the first valve body to a second configuration, and permitting, by the first valve body in the second configuration, the first fluid flow to the second fluid chamber. The method can include receiving, by a third fluid chamber of the second fluid actuator, the second fluid flow, urging, by the second fluid flow received by the third fluid chamber, a second piston of the second fluid actuator in a first direction, receiving, by a fourth fluid chamber of the second fluid actuator, the second fluid flow, and urging, by the second fluid flow received by the fourth fluid chamber, the second piston in a second direction opposite the first direction. The method can include configuring a second valve body of the second fluid valve to a first configuration, permitting, by the second valve body in the first configuration; the second fluid flow to the third fluid chamber, configuring the second valve body to a second configuration, and permitting, by the second valve body in the second configuration, the second fluid flow to the fourth fluid chamber. The method can include fluidically connecting a fluid inlet of the second fluid valve to a first fluid outlet of the second fluid valve in a first configuration, fluidically connecting the fluid inlet to a second fluid outlet of the second fluid valve in a second configuration, and fluidically connecting the fluid inlet to the first fluid outlet and the second fluid outlet in a third configuration.

In another example embodiment, a fluid actuator includes a housing, a first fluid actuator arranged within the housing and configured to actuate an output, and a second fluid actuator arranged within the housing and configured to redundantly actuate the output.

Various embodiments can include some, all, or none of the following features. The fluid actuator can include a first fluid valve configured to control a first fluid flow to the first fluid actuator, and a second fluid valve configured to control a second fluid flow to the second fluid actuator. The first fluid valve can include a first valve body configured to permit the first fluid flow to a first fluid chamber in a first configuration, permit the first fluid flow to a second fluid chamber in a second configuration, and block the first fluid flow to the first fluid chamber and the second fluid chamber in a third configuration. The second fluid valve can include a second valve body configured to permit the second fluid flow to a third fluid chamber in a first configuration, permit the second fluid flow to a fourth fluid chamber in a second configuration, and permit the second fluid flow to the third fluid chamber and the fourth fluid chamber in a third configuration. The second fluid valve can include, at least one fluid inlet, a first fluid outlet, a second fluid outlet, a valve body is configured to (1) fluidically connect the fluid inlet to the first fluid outlet in a first configuration, (2) fluidically connect the fluid inlet to the second fluid outlet in a second configuration, and (3) fluidically connect the fluid inlet to the first fluid outlet and the second fluid outlet in a third configuration. The first fluid actuator can include a first piston, a first fluid chamber configured to receive fluid to urge movement of the first piston in a first direction, and a second fluid chamber configured receive fluid to urge movement of the first piston in a second direction opposite the first direction. The second fluid actuator can include a second piston, a third fluid chamber configured to receive fluid to urge movement of the second piston in a first direction, and a fourth fluid chamber configured to receive fluid to urge movement of the second piston in a second direction opposite the first direction. The first fluid actuator can include a first piston rod affixed to the output, and the second fluid actuator comprises a second piston rod affixed to the output.

The systems and techniques described here may provide one or more of the following advantages. First, a system can provide redundant fluid actuation of an output with reduced force fight. Second, the system can reduce force fight without the use of a complex combination of sensors and control loops.

The details of one or more implementations are set forth in the accompanying drawings and the description below. Other features and advantages will be apparent from the description and drawings, and from the claims.

DETAILED DESCRIPTION

This document describes systems and techniques in which force fight between redundant fluid actuators is mitigated by a unique mechanical (e.g., fluidic control) design. In general, since many fluid actuators spend most of their operational lifetimes in a fixed position, most of the force fight that occurs during the operational lifetime will happen when the control valves are at null. This document describes examples of mechanical (e.g., fluid control) designs that mitigate force fight when the redundant fluid valves are at or near their null configurations.

In general, and as will be described in more detail throughout this document, a shared mechanical output is actuated by two (e.g., or more) redundant fluid actuators. Each of the redundant fluid actuators is controlled by a fluid (e.g., servo) valve, with one of the valves acting as the primary (e.g., leader) valve and the other acting as a secondary (e.g., follower) valve. The primary valve is configured to provide a conventional collection of three configurations in which fluid flow is directed to a first output (e.g., "extend"), to a second output (e.g., "retract"), or is blocked (e.g., null). The secondary valve is also configured to provide three configurations, including one in which fluid flow is directed to a first output (e.g., "extend"), another in which fluid flow is directed to a second output (e.g., "retract"), and another that permits at least a limited amount of fluid to flow between the fluid source and the first output and the second output (e.g., modified null). In general, by allowing the second valve to permit flow between opposing outputs of the secondary fluid actuator near null, the secondary actuator will be substantially unable to generate mechanical forces that could lead to force fight with the primary actuator when at or near null.

Figure 1:
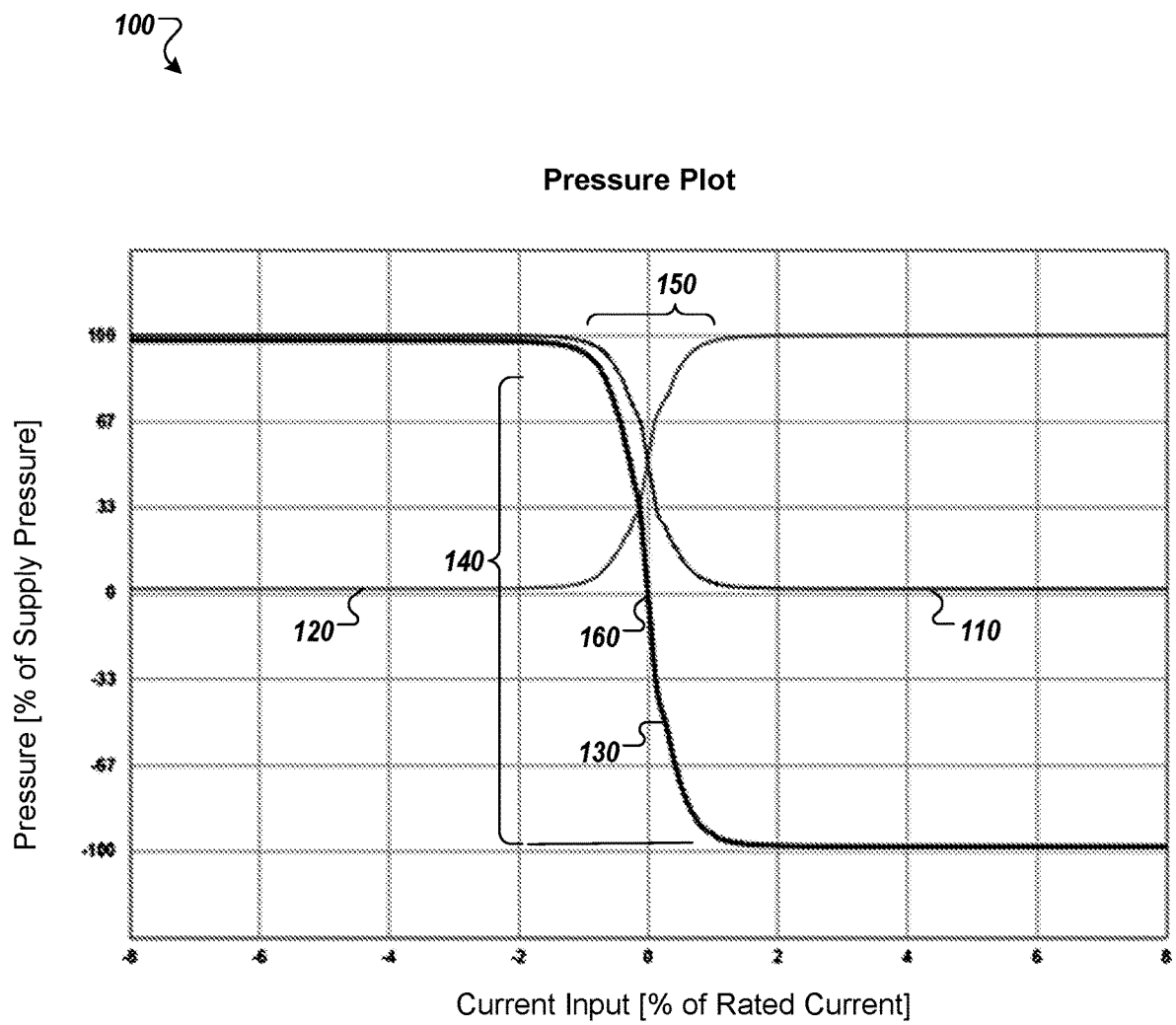
FIG. 1 is a chart of example prior art differential pressures in a prior art redundant fluid actuator.

FIG. 1 is a chart 100 of example prior art differential pressures in a prior art redundant fluid actuator. In the illustrated example, two substantially similar, redundant fluid control systems are used. A line 110 represents pressure versus input (e.g., control) power for a first fluid servo valve (e.g., a primary valve), and a line 120 represents pressure versus input (e.g., control) power for a second fluid servo valve (e.g., a redundant valve). The pressure represented by the line 120 is substantially the inverse of the pressure represented by the line 110. In the illustrated example, this inversion is used to illustrate a "worst case" scenario in which two valves connected to two redundant actuators are acting in opposition (e.g., when two control loops are both independently oscillating about a set point while independently trying to maintain a common target position).

When near the target position where only fine control movements are needed, the two control currents oscillate, sometimes in opposition, about the zero milliamp point. The difference between the pressures represented by the lines 110 and 120 is represented by a line 130 (e.g., differential pressure). As shown in the illustrated example, there is a relatively large swing 140 in differential pressures (e.g., +/−~75% of supply pressure) across a relatively small range 150 of control current values (e.g., +/−~1% of rated input current). In general, the steepness of the slope of the line 130 around zero pressure and zero current, represented by point 160, provides a visual representation of the severity of force fight that can occur around null in previous systems. Typically, such force fight would result in stresses or torques across a redundantly actuated mechanical output, and can result in system inefficiency, power loss, excessive wear, damage, and/or malfunction.

Prior techniques for addressing such force fights have included oversizing of the mechanical components to make them strong enough to better tolerate force fight. However, such solutions can increase costs, size, and weight of the overall system. Other prior techniques have included the use of pressure sensors to measure differential pressures and closed control loops to control the positions of the redundant valves in order to mitigate force fight. However, such solutions increase system complexity, can require skilled tuning, and include components that have their own unavoidable differences that can actually contribute to force fight and at least partly offset the benefits they were intended to provide.

Figure 2:
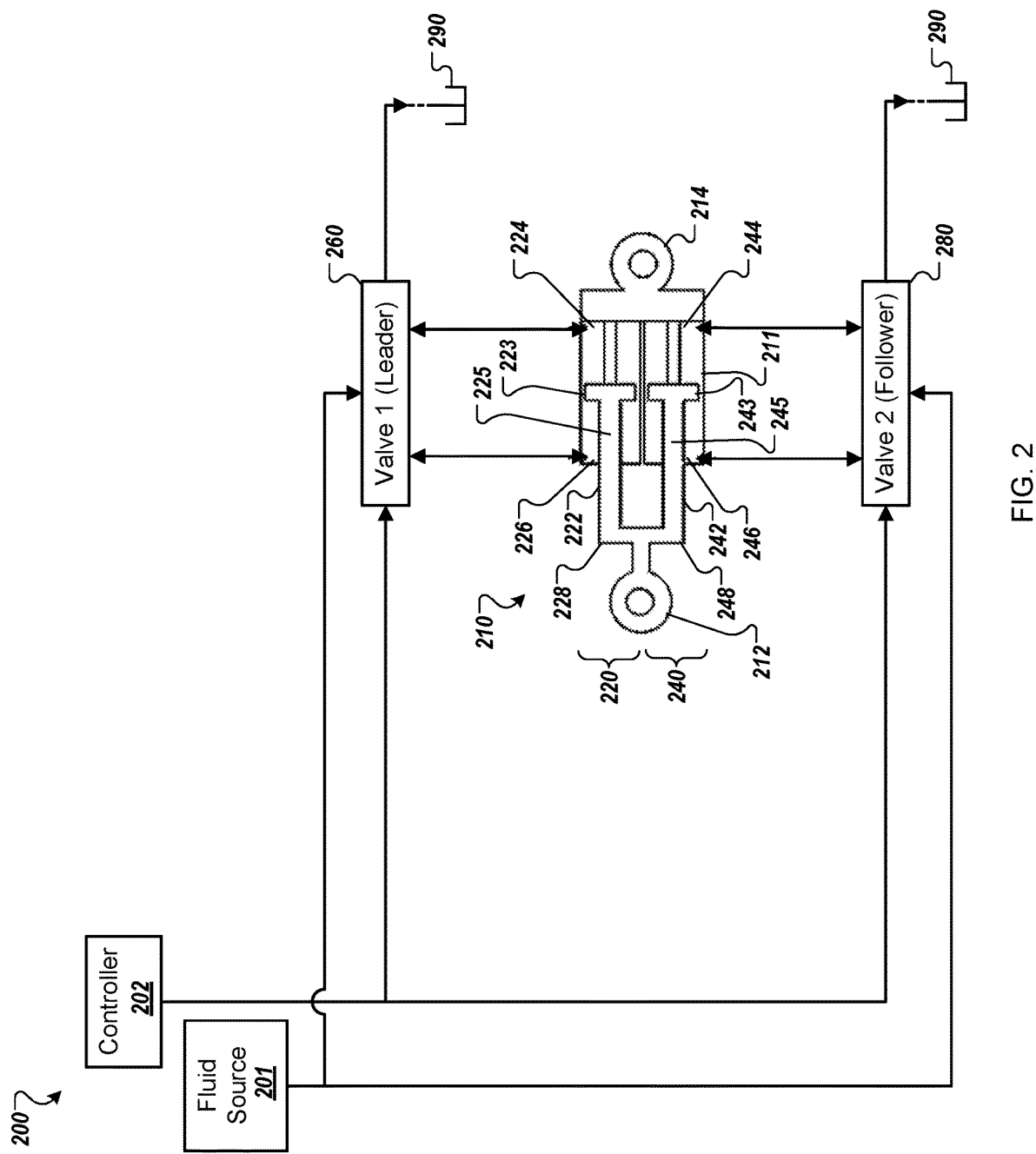
FIG. 2 is a block diagram of an example redundant fluid actuator system

FIG. 2 is a block diagram of an example redundant fluid actuator system 200. The system 200 includes an actuator 210 having a housing 211 configured to actuate a mechanical output 212 relative to a mounting point 214.

The actuator 210 is a dual-redundant fluid actuator that includes a primary fluid actuator 220 and a secondary fluid actuator 240 within the housing 211. The primary fluid actuator 220 and the secondary fluid actuator 240 are both configured to actuate the mechanical output 212 relative to the mounting point 214, cooperatively or independently.

The primary fluid actuator 220 includes a piston 222 having a piston head 223 and a piston rod 225 and configured to receive fluid to urge movement of the piston 222 in a first direction (e.g., extend) based on fluid pressure in a fluid chamber 224, and retract based on fluid pressure in a fluid chamber 226. The piston rod 225 of the primary fluid actuator 220 is mechanically affixed to the mechanical output 212 at an end 228.

The secondary fluid actuator 240 includes a piston 242 having a piston head 243 and a piston rod 245 and configured to receive fluid to urge movement of the piston 242 in a first direction (e.g., extend) based on fluid pressure in a fluid chamber 244, and retract based on fluid pressure in a fluid chamber 246. The piston rod 245 of the secondary fluid actuator 240 is mechanically affixed to the mechanical output 212 at an end 248.

Without the force fight mitigation solutions that will be described in more detail below, since the end 228 and the end 248 are both affixed to the mechanical output 212, any differences in the positions of the pistons 222 and 242 and/or differences in the amounts of force being provided by the pistons 222 and 242 can cause stress within the mechanical output 212. In some examples, such stresses can cause the mechanical output 212 to develop stress fractures that can lead to eventual malfunction or failure. In some examples, such differences in outputs can cause the actuator 210 to warp or bend, causing bending stresses along the pistons 222 and/or 224, causing binding and reduced output power, and/or causing excessing wear of internal fluid seals that can lead to eventual malfunction of failure. However, the actuator 210 includes force fight mitigation solutions that reduce or eliminate such problems when the actuator 210 is substantially motionless (e.g., aircraft flaps are either deployed or stowed for hours, with a few seconds of deployment and retraction in-between).

A primary valve 260 (e.g., leader valve) controls flow of a pressurized fluid from a pressurized fluid source 201 to the fluid chambers 224 and 226 of the primary fluid actuator 220. In some embodiments, the primary valve 260 can be an electrohydraulic servo valve (EHSV). The primary valve 260 is configured to be controlled by a controller 202 (e.g., the controller 202 can provide control currents that actuate the primary valve 260). The primary valve 260 is configured to direct fluid flow from the fluid source 201 to the fluid chamber 224 in a first valve configuration (e.g., to extend the piston 222 and the mechanical output 212), to direct fluid flow from the fluid source 201 to the fluid chamber 226 in a second valve configuration (e.g., to retract the piston 222 and the mechanical output 212), and to block fluid flow among the fluid source 201, the fluid chamber 224, and the fluid chamber 226 in a third configuration (e.g., null, hydraulically blocking the primary fluid actuator 220). Excess fluid is directed to a drain 290. An example of the primary valve 260 will be discussed further in the description of FIGS. 3A-3C.

A secondary valve 280 (e.g., follower valve, redundant backup valve) controls flow of the pressurized fluid from the pressurized fluid source 201 to the fluid chambers 244 and 246 of the secondary fluid actuator 240. In some embodiments, the secondary valve 280 can be an electrohydraulic servo valve (EHSV). The secondary valve 280 is configured to be controlled by the controller 202 (e.g., the controller 202 can provide control currents that actuate the secondary valve 280). The secondary valve 280 is configured to direct fluid flow from the fluid source 201 to the fluid chamber 244 in a first valve configuration (e.g., to extend the piston 242 and the mechanical output 212), and to direct fluid flow from the fluid source 201 to the fluid chamber 246 in a second valve configuration (e.g., to retract the piston 242 and the mechanical output 212). The secondary valve 280 also has a third configuration that differs from the third configuration of the primary valve 260.

In the third configuration of the secondary valve 280, pressurized fluid flow from the fluid source 201 is blocked, but a (e.g., slight) fluid flow is permitted between the fluid chamber 244 and the fluid chamber 246. In this third configuration, fluid pressure from the fluid source 201 is blocked, but the secondary fluid actuator is not hydraulically blocked in a small region around the null point of the secondary valve 280. As such, when the secondary valve 280 is commanded to be at or near null, the secondary fluid actuator 240 exerts no fluid force (e.g., because any pressure in the fluid chambers 244 and 246 would leak down and/or equalize). With no fluid force being exerrted proximal the null position of the secondary valve, the secondary fluid actuator 240 will mechanically follow the movement of the primary fluid actuator 220 substantially without force fight. Excess fluid is directed to a drain 290. An example of the secondary valve 280 will be discussed further in the description of FIGS. 3A-3C.

Figure 3A:
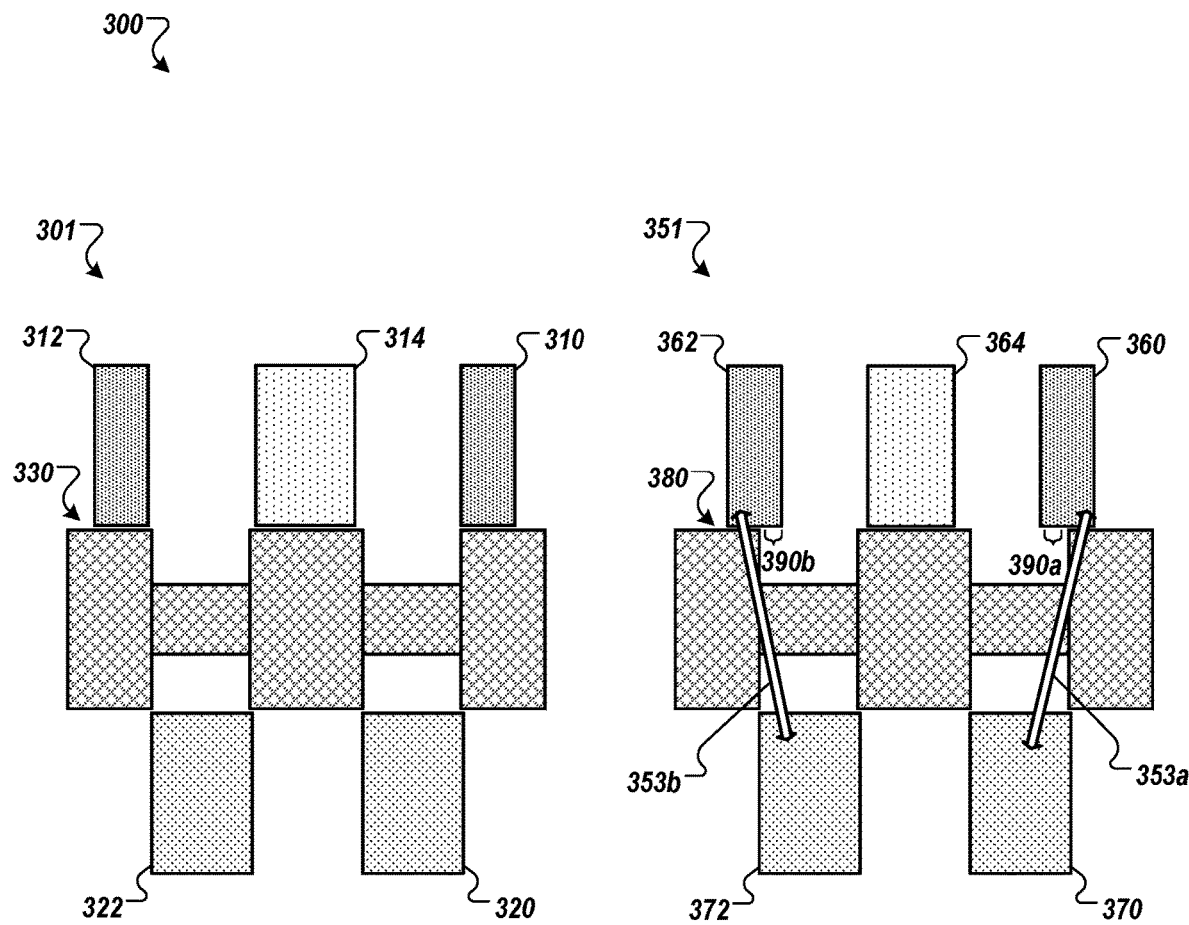
FIGS. 3A-3C are block diagrams of an example system 300 of example redundant fluid valves under various conditions.

FIG. 3A is a block diagram of an example system 300 of example redundant fluid valves in a null configuration. The system includes a primary fluid valve 301 and a secondary fluid valve 351. In some embodiments, the primary fluid valve 301 can be the example primary valve 260 of FIG. 2. In some embodiments, the primary fluid valve 351 can be the example secondary valve 280. In some embodiments, one or both of the primary fluid valve 301 and the secondary fluid valve 351 can be electrohydraulic servo valves (EHSVs).

In use, the primary fluid valve 301 is configured to control a fluid flow from a pressurized fluid source (e.g., the example fluid source 201) to a first fluid actuator (e.g., the example primary fluid actuator 220). In use, the secondary fluid valve 351 is configured to control a fluid flow from a pressurized fluid source (e.g., the example fluid source 201) to a second fluid actuator (e.g., the example secondary fluid actuator 240).

The primary fluid valve 301 includes a fluid port 310 (e.g., a first fluid inlet) and a fluid port 312 (e.g., a second fluid inlet) that are configured to be fluidically connected to a first fluid pressure source (e.g., the example fluid source 201). A fluid port 314 is configured to be fluidically connected to a fluid drain (e.g., the example fluid drain 290). A fluid port 320 (e.g., a first fluid outlet) is configured to be fluidically connected to a first fluid chamber of a primary fluid actuator (e.g., the example fluid chamber 224 of the example primary fluid actuator 220). A fluid port 322 (e.g., a second fluid outlet) is configured to be fluidically connected to a second fluid chamber of a primary fluid actuator (e.g., the example fluid chamber 226 of the example primary fluid actuator 220).

The primary fluid valve 301 includes a valve body 330 (e.g., a valve spool) configured to direct fluid flows among the fluid ports 310-322. The valve body 330 can be positioned in three configurations relative to the fluid ports 310-322. FIG. 3A shows the primary fluid valve 301 in a null configuration in which fluid flow through all of the fluid ports 310-322 is blocked. Additional configurations are discussed in the descriptions of FIGS. 3B and 3C.

The secondary fluid valve 351 includes a fluid port 360 (e.g., a first fluid inlet) and a fluid port 362 (e.g., a second fluid inlet) that are configured to be fluidically connected to a second fluid pressure source (e.g., the example fluid source 201 or a redundant backup fluid source). A fluid port 364 is configured to be fluidically connected to a fluid drain (e.g., the example fluid drain 290). A fluid port 370 (e.g., a first fluid outlet) is configured to be fluidically connected to a first fluid chamber of a primary fluid actuator (e.g., the example fluid chamber 244 of the example secondary fluid actuator 240). A fluid port 372 (e.g., a second fluid outlet) is configured to be fluidically connected to a second fluid chamber of the secondary fluid actuator (e.g., the example fluid chamber 246 of the example secondary fluid actuator 240).

The secondary fluid valve 351 includes a valve body 380 (e.g., a valve spool) configured to direct fluid flows among the fluid ports 360-372. The valve body 380 can be positioned in three configurations relative to the fluid ports 360-372. FIG. 3A shows the secondary fluid valve 351 in a null configuration in which fluid flow to the fluid port 364 is blocked (e.g., fluid drainage is blocked), but the valve body 380 is configured with a lapping 390a and a lapping 390b that permits an at least partial flow of fluid between the fluid ports 360 and 370 (represented by arrow 353a), and an at least partial flow of fluid between the fluid ports 362 and 372 (represented by arrow 353b).

Figure 3B:
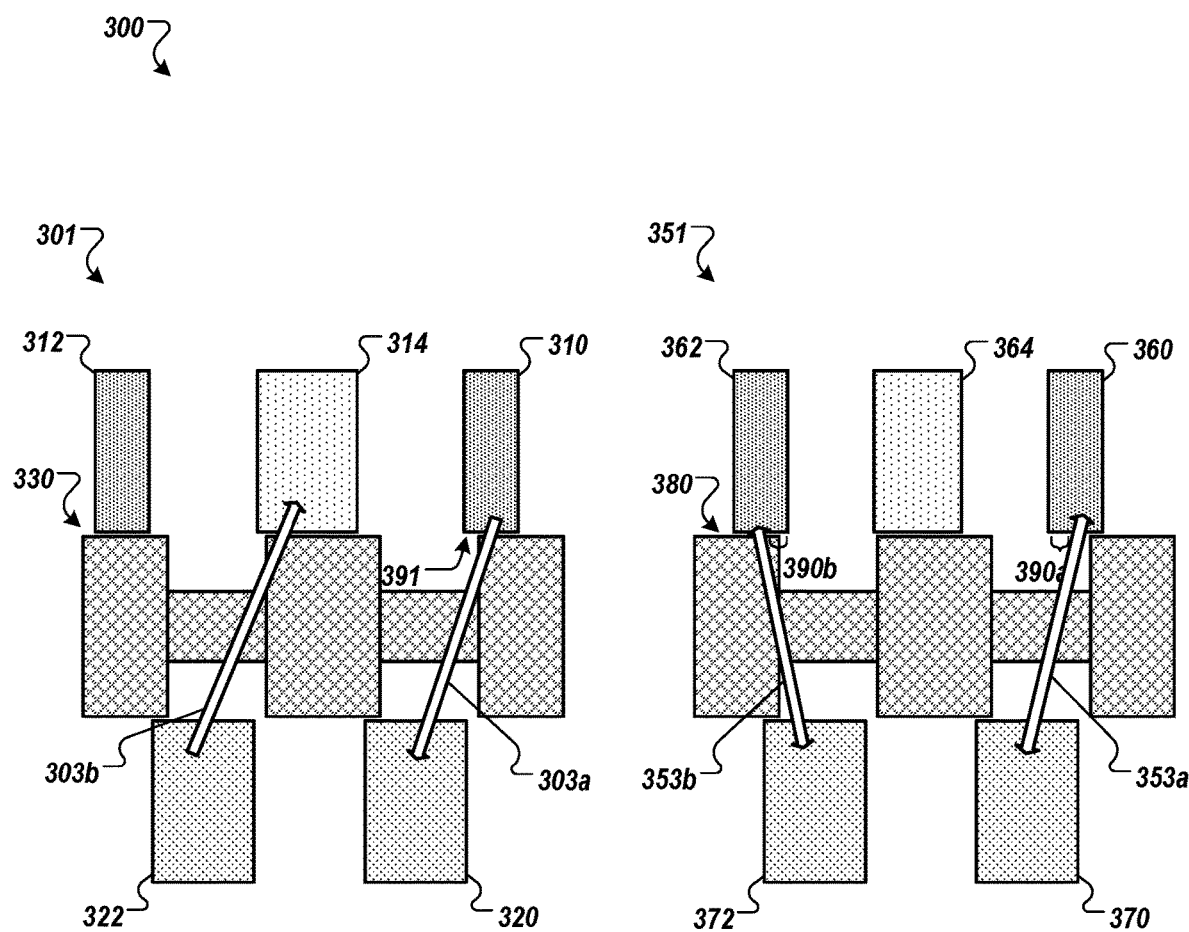

FIG. 3B shows the system 300 in a configuration in which the fluid valves 301 and 351 have been urged into a configuration that could urge movement of a connected fluid actuator. In the illustrated example, the valve body 330 and the valve body 380 have been shifted slightly to the right (e.g., relative to the example shown in FIG. 3A). The illustrated rightward shifting serves merely as an example, and slight leftward shifting would provide similarly opposite effects.

In the primary fluid valve 301, the position of the valve body 330 blocks fluid flow though the fluid port 312, permits fluid flow between the fluid port 310 (e.g., pressurized fluid) and the fluid port 320 (e.g., a fluid chamber of an actuator) (represented by arrow 303a) through an aperture 391 opened between the valve body 330 and the fluid port 310, and permits fluid flow between the fluid port 322 (e.g., an opposing fluid chamber of the actuator) and the fluid port 324 (e.g., a fluid drain) (represented by arrow 303b). In use, this configuration would urge movement of a primary fluid actuator connected to the primary fluid valve 301.

However, movement of a connected fluid actuator will urge movement of a corresponding secondary fluid actuator that is connected to the secondary fluid valve 351. Such movement can cause fluid to be urged through the fluid ports 370 and 372. Additionally, the valve body 380, acting redundantly to the valve body 330, is also moved slightly to the right (e.g., relative to the example shown in FIG. 3A).

In the secondary fluid valve 351, the lapping 390a of the valve body 380 permits fluid flow 353a between the fluid port 360 (e.g., pressurized fluid) and the fluid port 370 (e.g., a fluid chamber of an actuator), and the lapping 390b permits fluid flow 353b between the fluid port 372 (e.g., an opposing fluid chamber of the actuator) and the fluid port 364 (e.g., a fluid drain). As such, the fluid pressures provided to the opposing fluid chambers of the secondary actuator connected to the fluid ports 370 and 372 will be substantially equal and offsetting, and fluid movement cause by movement of the secondary fluid actuator (e.g., by movement of the primary fluid actuator) will be substantially unblocked and offer substantially no fluidic blocking action. Since the secondary actuator controlled by the secondary fluid valve 351 is essentially "floating" in this configuration, the secondary actuator provides substantially no force fight relative to the primary actuator being controlled by the primary fluid valve 301.

Figure 3C:
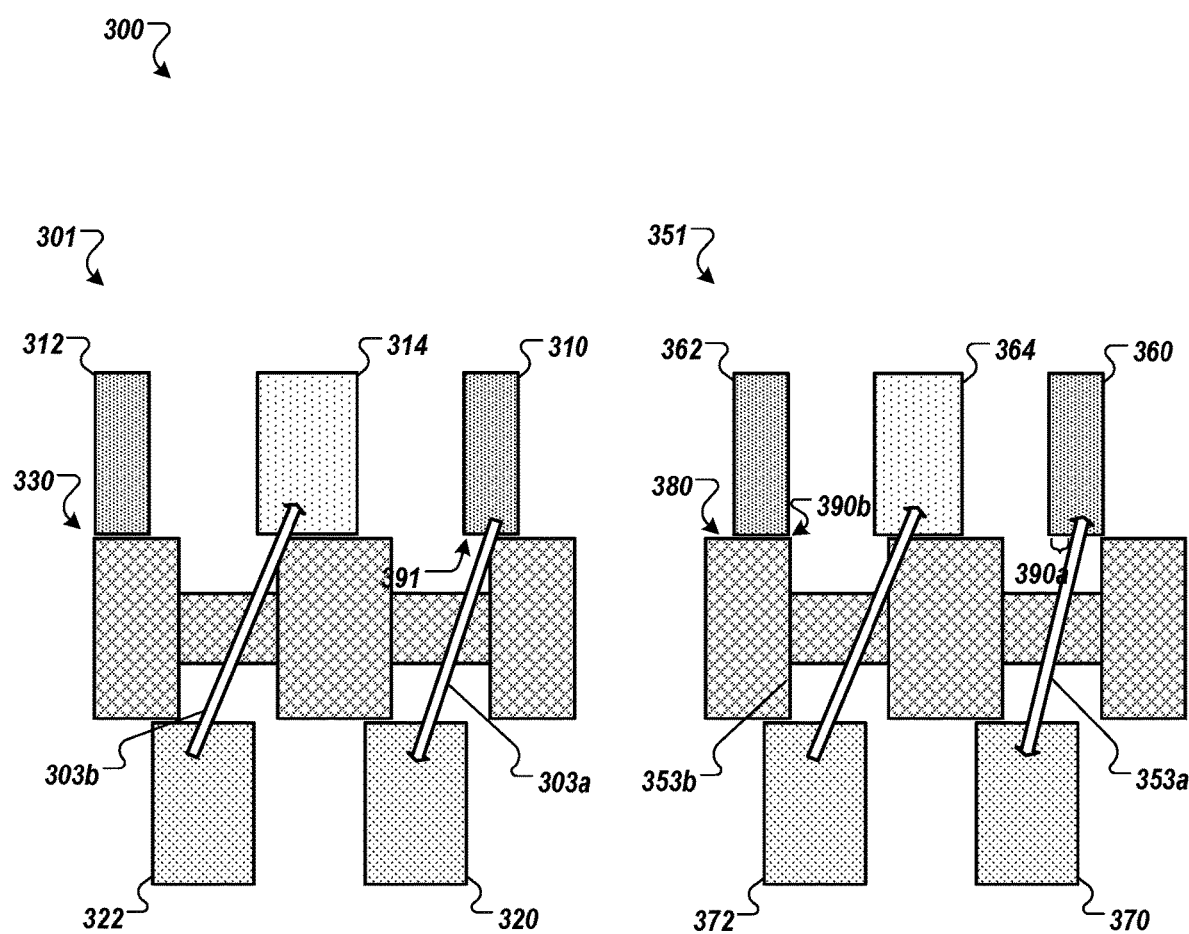

FIG. 3C shows the system 300 in a configuration in which the fluid valves 301 and 351 have been urged into a configuration that could urge movement of a connected fluid actuator. In the illustrated example, the valve body 330 and the valve body 380 have been shifted even further to the right (e.g., relative to the examples shown in FIGS. 3A and 3B). The illustrated rightward shifting serves merely as an example, and further leftward shifting would provide similarly opposite effects.

In the primary fluid valve 301, the position of the valve body 330 continues to block fluid flow though the fluid port 312, continues to permit fluid flow between the fluid port 310 (e.g., pressurized fluid) and the fluid port 320 (e.g., a fluid chamber of an actuator) (represented by arrow 303a) through an aperture 391 opened between the valve body 330 and the fluid port 310, and continues to permit fluid flow between the fluid port 322 (e.g., an opposing fluid chamber of the actuator) and the fluid port 324 (e.g., a fluid drain) (represented by arrow 303b). In use, this configuration would urge movement of a primary fluid actuator connected to the primary fluid valve 301.

In the secondary fluid valve 351, the position of the valve body 380 permits fluid flow 353a between the fluid port 360 (e.g., pressurized fluid) and the fluid port 370 (e.g., a fluid chamber of an actuator). However, the movement of the valve body 380 has exceeded the lapping 390b such that the lapping 390b no longer permits fluid flow 353b between the fluid port 372 and the fluid port 362, and the position of the valve body 380 permits fluid flow between the fluid port 372 and the fluid port 364. As such, the secondary fluid valve 351 provides a fluid flow having a direction that is substantially similar and redundant to the fluid flow that is provided by the primary fluid valve 301.

Under normal operating conditions in which the primary fluid valve 301 and its respective primary fluid actuator are operating nominally, the forces caused by the secondary fluid valve and its respective secondary fluid actuator may be imbalanced. However, since both fluid valves 301, 351 are acting cooperatively, the force fight is generally much less than it might be near the null position where the fluid valves 301, 351 may be in opposition. Furthermore, in some embodiments, the fluid valves 301, 351 may only be configured to this potentially force-fight permitting condition for brief periods of time (e.g., only when periodically extending or retracting an redundant actuator that generally remains stationary most of the time, such as an aircraft flap actuator, a thrust reverser nacelle, or a landing gear actuator).

Under abnormal operating conditions in which the primary fluid valve 301 and/or its respective primary fluid actuator are not operating nominally, the secondary fluid valve 351 and its respective secondary fluid actuator can provide the control and fluid force used to control the mechanical output. The main behavioral difference that may be exhibited by the secondary fluid valve 351 compared to the primary fluid valve 301 is a slight lag in responsiveness due to the additional movement of the valve body 380 in order to overcome the lapping 390*a* and/or the lapping 390*b* before direction-controlling fluid flows begin. However, in some implementations the valve body 380 may be under closed-loop control that would compensate for the lapping 390*a* and the lapping 390*b*. For example, if an associated mechanical output were to be extended or retracted, a control signal would be provided to move the configuration of the valve body 380. If the movement of the valve body 380 were insufficient to cause movement of the controlled mechanical output, the control loop would likely increase the control current used to move the valve body 380 and eventually overcome the lapping 390*a* and/or the lapping 390*b*. Once the lappings 390*a*-390*b* have been overcome, the response behavior of the secondary fluid valve 351 becomes substantially similar to the response behavior of the primary fluid valve 301 under similar control conditions.

Figure 4A:
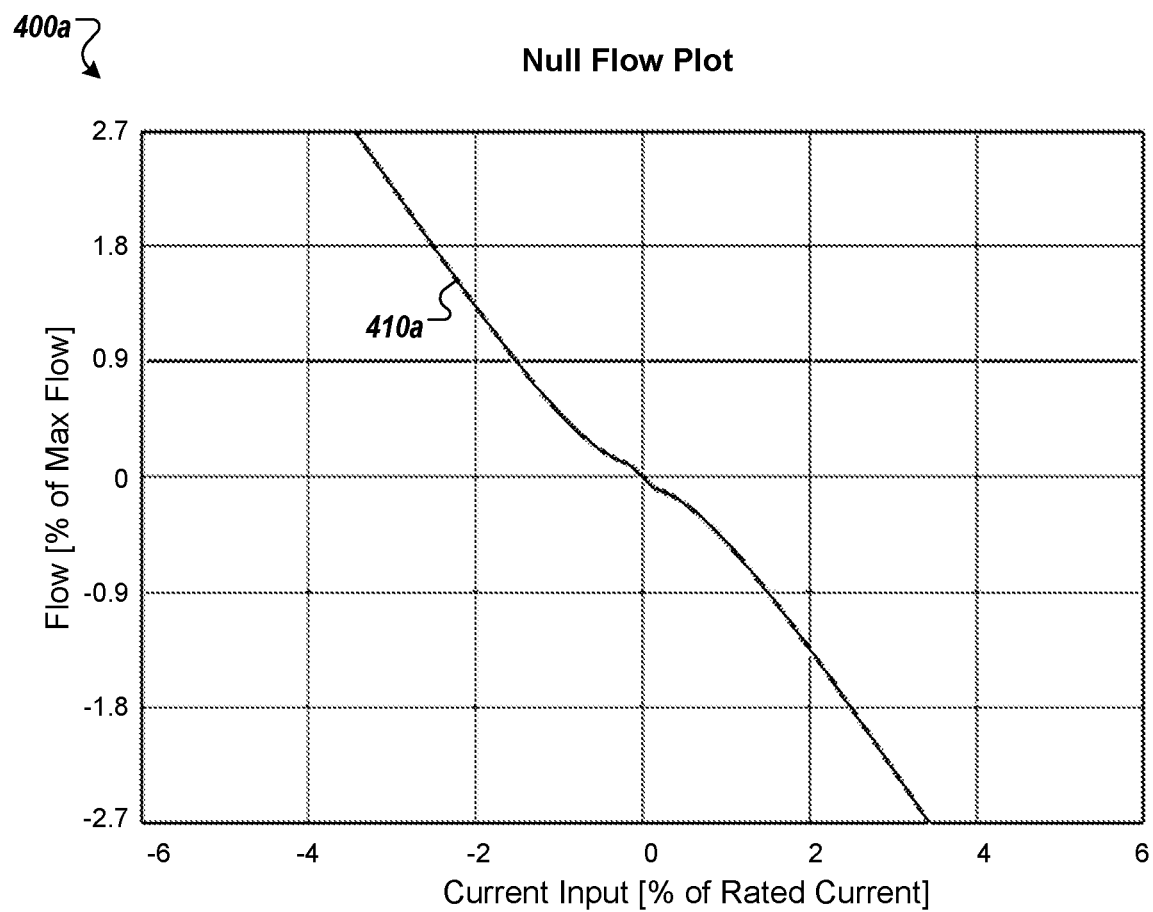
FIGS. 4A and 4B are charts of example fluid flows in an example redundant fluid actuator.
Figure 4B:
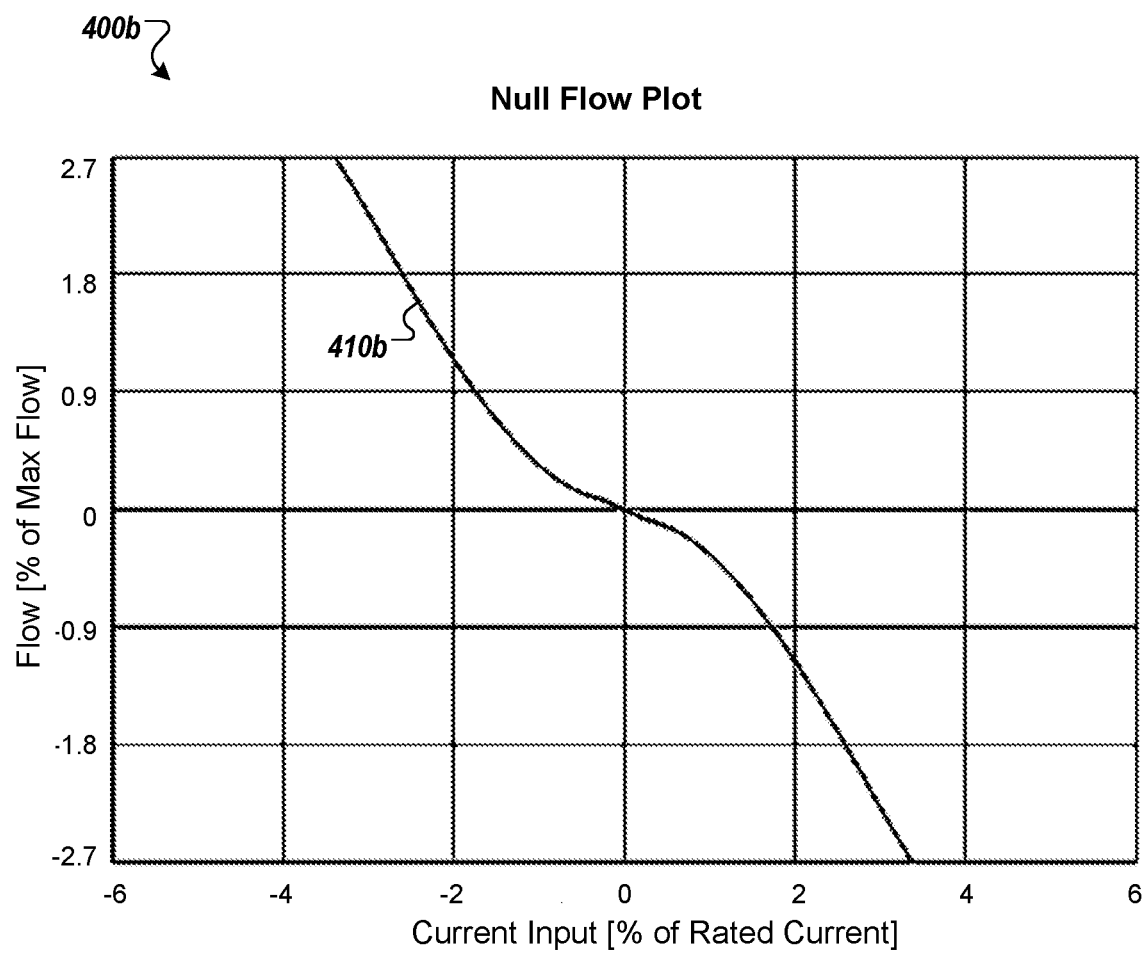

FIGS. 4A and 4B are charts of example fluid flows in an example redundant fluid actuator. FIG. 4A shows a chart 400*a* of an example primary flow output 410*a* versus input (e.g., control) power for an example primary fluid valve. In some implementations, the primary flow output can represent the output of the example primary fluid valve 301 of FIGS. 3A-3C. As is shown in the illustrated example, small changes in control current about the null point (e.g., a between bout −0.25% to about +0.25% of rated input current) cause changes in output flow (e.g., between about −0.1% to about +0.1% of maximum flow). In use, these flows can urge the movement of a primary fluid actuator of a dual-redundant fluid actuator such as the example primary fluid actuator 220 of the example actuator 210 of FIG. 2.

FIG. 4B shows a chart 400*b* of an example primary flow output 410*b* versus input (e.g., control) power for an example secondary fluid valve. In some implementations, the secondary flow output can represent the output of the example secondary fluid valve 351 of FIGS. 3A-3C. As is shown in the illustrated example, relatively larger changes in control current (e.g., compared to the chart 400*a*) about the null point (e.g., between about −1.0% to about +1.0% of rated input current) cause changes in output flow (e.g., between about −0.1% to about +0.1% of maximum flow). In use, these flows can urge the movement of a secondary fluid actuator of a dual-redundant fluid actuator such as the example secondary fluid actuator 240 of the example actuator 210 of FIG. 2. The relatively wider window of response around the zero input current point is due to the presence of lapping in the secondary fluid valve (e.g., the example lapping 390*a* and/or 390*b*).

Figure 5:
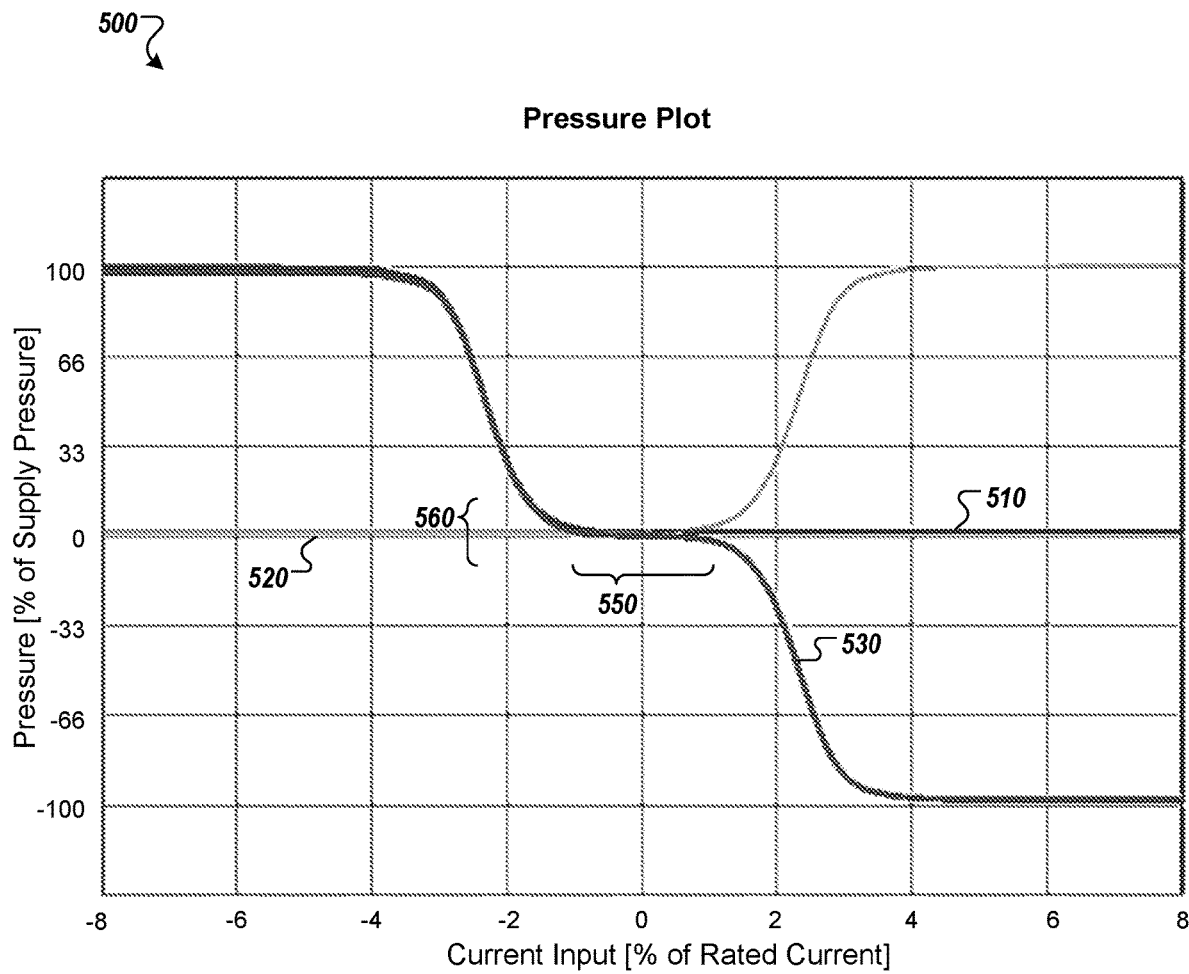
FIG. 5 is a chart of example differential pressures in an example redundant fluid actuator.

FIG. 5 is a chart 500 of example differential pressures in an example redundant fluid actuator. In some implementations, the chart 500 can represent the pressures produced by the example systems 200 or 300 of FIGS. 2-3C. In some implementations, the chart 500 can represent pressures that arise from the example flow outputs 410*a*, 410*b* of FIGS. 4A-4B.

A line 510 represents pressure versus input (e.g., control) power for a first fluid servo valve (e.g., a primary valve), and a line 520 represents pressure versus input (e.g., control) power for a second fluid servo valve (e.g., a redundant valve). The pressure represented by the line 520 is substantially the inverse of the pressure represented by the line 510. In the illustrated example, this inversion is used to illustrate a "worst case" scenario in which two valves connected to two redundant actuators are acting in opposition (e.g., when two control loops are both independently oscillating about a set point while independently trying to maintain common target position).

When near the target position where only fine control movements are needed, the two control currents oscillate, sometimes in opposition, about the zero milliamp point. The difference between the pressures represented by the lines 510 and 520 is represented by a line 530 (e.g., differential pressure). As shown in the illustrated example, there is a relatively large window 550 of control currents about the null point (e.g., between about −1.0% to about +1.0% of rated input current) in which there is a relatively narrow range 560 of differential pressures (e.g., between about +10% to about −10% of supply pressure). In general, the flatness of the slope of the line 530 around zero pressure and zero input current within the window 550 provides a visual representation of the range in which force fight is mitigated (e.g., by the lappings 390*a*-390*b*). In some examples, mitigation of force fight around the null point can mitigate stresses or torques across a redundantly actuated mechanical output, which can improve the system efficiency, power, mechanical lifespan, and/or reliability of connected mechanical outputs.

Figure 6:
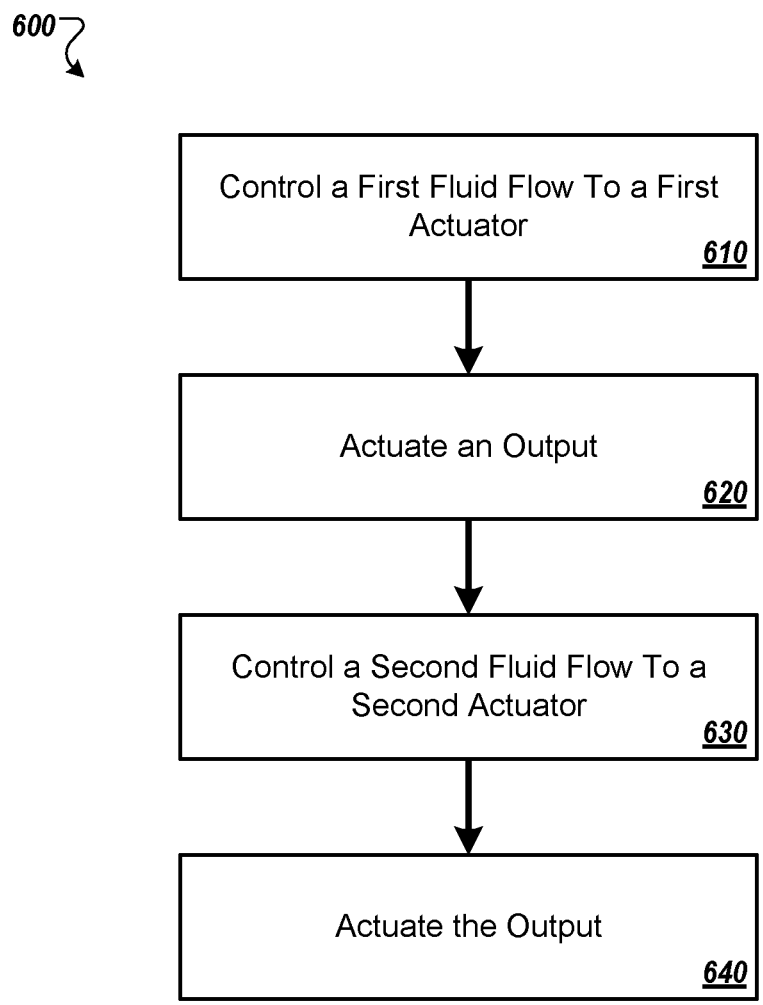
FIG. 6 is a flow diagram of an example process of redundant fluid actuation.

FIG. 6 is a flow diagram of an example process 600 of redundant fluid actuation. In some implementations, the process 600 can be performed by the example redundant fluid actuator system 200 of FIG. 2.

At 610, a first fluid valve is controlled to control a first fluid flow to a first fluid actuator. For example, the primary valve 260 can control flow of pressurized fluid from the pressurized fluid source 201 to the fluid chambers 224 and 226 of the primary fluid actuator 220.

At 620, the first fluid actuator actuates an output. For example, the primary fluid actuator 220 can receive fluid to urge movement of the piston 222 in a first direction (e.g., extend) based on fluid pressure in a fluid chamber 224, and retract based on fluid pressure in a fluid chamber 226.

At 630, a second fluid valve is controlled to control a second fluid flow to a second fluid actuator. In some implementations, the process 600 can include receiving, by a third fluid chamber of the second fluid actuator, the second fluid flow, urging, by the second fluid flow received by the third fluid chamber, a second piston of the second fluid actuator in a first direction, receiving, by a fourth fluid chamber of the second fluid actuator, the second fluid flow, and urging, by the second fluid flow received by the fourth fluid chamber, the second piston in a second direction opposite the first direction. For example, the secondary valve can control flow of pressurized fluid from the pressurized fluid source 201 to the fluid chambers 244 and 246 of the secondary fluid actuator 240.

At 640, the second fluid actuator actuates the output. For example, the secondary fluid actuator 240 can receive fluid to urge movement of the piston 242 in a first direction (e.g., extend) based on fluid pressure in a fluid chamber 244, and retract based on fluid pressure in a fluid chamber 246.

In some implementations, the process 600 can include receiving, by a first fluid chamber of the first fluid actuator, the first fluid flow, urging, by the first fluid flow received by the first fluid chamber, a first piston of the first fluid actuator in a first direction, receiving, by a second fluid chamber of the first fluid actuator, the first fluid flow, and urging, by the first fluid flow received by the second fluid chamber, the first piston in a second direction opposite the first direction. For example, the primary fluid actuator 220 can receive fluid to urge movement of the piston 222 in a first direction (e.g., extend) based on fluid pressure in a fluid chamber 224, and retract based on fluid pressure in a fluid chamber 226.

In some implementations, the process 600 can include configuring a first valve body of the first fluid valve to a first configuration, permitting, by the first valve body in the first configuration, the first fluid flow to the first fluid chamber, configuring the first valve body to a second configuration, and permitting, by the first valve body in the second configuration, the first fluid flow to the second fluid chamber. For example, the primary valve 260 can be configured to direct fluid flow from the fluid source 201 to the fluid chamber 224 in a first valve configuration (e.g., to extend the piston 222 and the mechanical output 212), to direct fluid flow from the fluid source 201 to the fluid chamber 226 in a second valve configuration (e.g., to retract the piston 222 and the mechanical output 212), and to block fluid flow among the fluid source 201, the fluid chamber 224, and the fluid chamber 226 in a third configuration (e.g., null, hydraulically blocking the primary fluid actuator 220).

In some implementations, the process 600 can include configuring a second valve body of the second fluid valve to a first configuration, permitting, by the second valve body in the first configuration, the second fluid flow to the third fluid chamber, configuring the second valve body to a second configuration, and permitting, by the second valve body in the second configuration, the second fluid flow to the fourth fluid chamber. For example, the secondary valve 280 can be configured to direct fluid flow from the fluid source 201 to the fluid chamber 244 in a first valve configuration (e.g., to extend the piston 242 and the mechanical output 212), and to direct fluid flow from the fluid source 201 to the fluid chamber 246 in a second valve configuration (e.g., to retract the piston 242 and the mechanical output 212).

In some implementations, the process 600 can include fluidically connecting a fluid inlet of the second fluid valve to a first fluid outlet of the second fluid valve in a first configuration, fluidically connecting the fluid inlet to a second fluid outlet of the second fluid valve in a second configuration, and fluidically connecting the fluid inlet to the first fluid outlet and the second fluid outlet in a third configuration. For example, the example secondary fluid valve 351 can be configured to the configurations shown in FIGS. 3A-3C.

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A fluid actuator system comprising:
a first fluid actuator configured to actuate an output and comprising a first fluid chamber and a second fluid chamber;
a second fluid actuator operating in parallel with the first fluid actuator and configured to redundantly actuate, with the first fluid actuator, the output, the second fluid actuator comprising a third fluid chamber and a fourth fluid chamber;
a first fluid valve configured to control a first fluid flow to the first fluid actuator, the first fluid valve comprising a first valve body configured to permit the first fluid flow to the first fluid chamber in a first configuration, permit the first fluid flow to the second fluid chamber in a second configuration, and block the first fluid flow to the first fluid chamber and the second fluid chamber in a third configuration; and
a second fluid valve configured to control a second fluid flow to the second fluid actuator, the second fluid valve comprising a second valve body configured to permit the second fluid flow to the third fluid chamber in the first configuration, permit the second fluid flow to the fourth fluid chamber in the second configuration, and is substantially unblocked and offers substantially no fluidic blocking action to permit the second fluid flow to the third fluid chamber and the fourth fluid chamber in the third configuration.

2. The fluid actuator system of claim 1, wherein:
the first fluid actuator comprises a first piston, the first fluid chamber is configured to receive fluid to urge movement of the first piston in a first direction, and the second fluid chamber is configured to receive fluid to urge movement of the first piston in a second direction opposite the first direction.

3. The fluid actuator system of claim 1, wherein:
the second fluid actuator comprises a second piston, the third fluid chamber is configured to receive fluid to urge movement of the second piston in a first direction, and the fourth fluid chamber is configured to receive fluid to urge movement of the second piston in a second direction opposite the first direction.

4. The fluid actuator system of claim 1, wherein the second fluid valve comprises at least one fluid inlet, a first fluid outlet, and a second fluid outlet, and the second valve body is configured to (1) fluidically connect the at least one fluid inlet to the first fluid outlet in the first configuration, (2) fluidically connect the at least one fluid inlet to the second fluid outlet in the second configuration, and (3) fluidically connect the at least one fluid inlet to the first fluid outlet and the second fluid outlet in the third configuration.

5. The fluid actuator system of claim 1, wherein the second fluid valve is a redundant backup fluid valve and the second fluid actuator is a redundant fluid actuator arranged to operate as a backup actuator in case of failure of the first actuator.

6. The fluid actuator system of claim 1, wherein the first fluid actuator comprises a first piston rod affixed to the output and the second fluid actuator comprises a second piston rod affixed to the output.

7. The fluid actuator system of claim 1, wherein the second valve body offers substantially no fluidic blocking action to permit the second fluid flow to the third fluid chamber and the fourth fluid chamber in the third configuration so that the second fluid actuator is in a floating position to substantially match a position of the first fluid actuator.

8. The fluid actuator system of claim 1, wherein the first valve body is configured to permit the first fluid flow to the first fluid chamber in a fourth configuration and permit the first fluid flow to the second fluid chamber in a fifth configuration, and the second valve permits the second fluid flow to the third fluid chamber and the fourth fluid chamber in the fourth configuration and in the fifth configuration.

* * * * *